Feb. 14, 1967 C. T. REEVES, JR 3,303,724
POWER TRANSMITTING APPARATUS
Filed Dec. 17, 1964 2 Sheets-Sheet 1
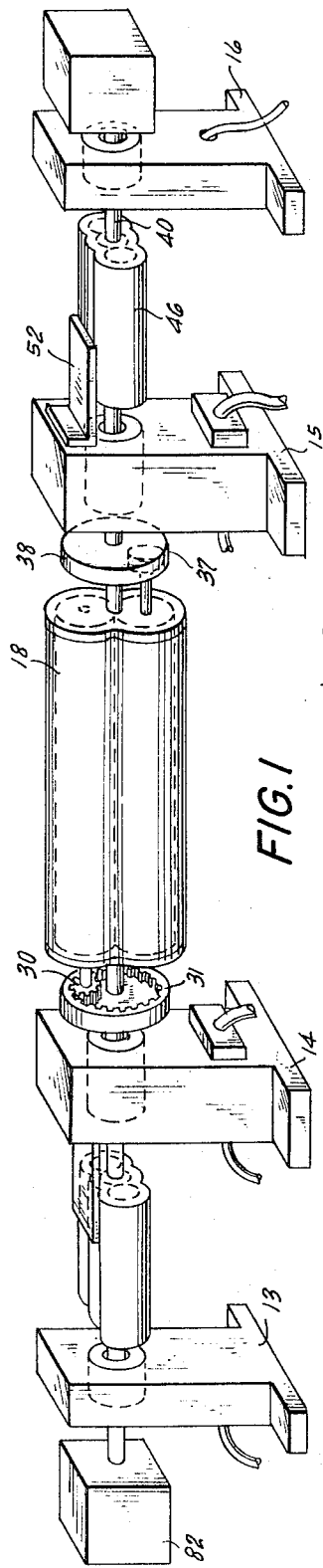
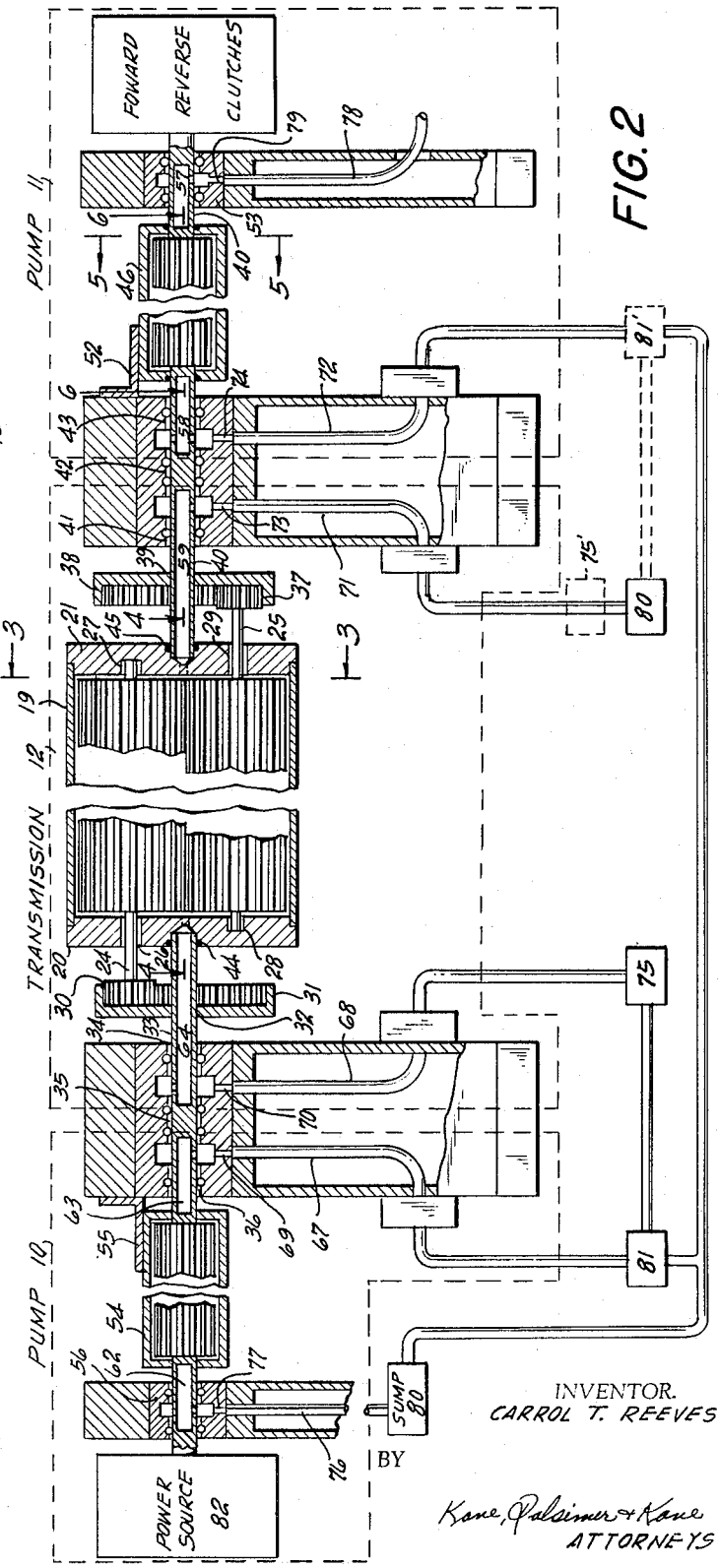
INVENTOR.
CARROL T. REEVES jr
BY
Kane, Dalsimer & Kane
ATTORNEYS Feb. 14, 1967  C. T. REEVES, JR  3,303,724
POWER TRANSMITTING APPARATUS
Filed Dec. 17, 1964  2 Sheets-Sheet 2

INVENTOR
CARROL T. REEVES Jr
BY
Kane, Dalsimer & Kane
ATTORNEYS

United States Patent Office 3,303,724
Patented Feb. 14, 1967

3,303,724
POWER TRANSMITTING APPARATUS
Carroll T. Reeves, Jr., P.O. Box 608,
East Setauket, N.Y. 11785
Filed Dec. 17, 1964, Ser. No. 419,123
8 Claims. (Cl. 74—687)

This invention relates to a power transmitting apparatus or coupling.

It is an object of this invention to provide an all gear transmission apparatus having means for continuously varying the ratio of coupling in either direction from a condition of maximum rotation of input shaft and zero rotation of an output shaft to the condition of rotation of output shaft greater than input shaft.

It is another object of this invention to provide a power transmitting apparatus which is capable of coupling a variable power source to a constant load, a constant power source to a varying load, or a variable power source to a variable load.

It is another object of this invention to provide a power transmitting apparatus in which the power flow can be simply controlled by control of fluid flow and which is theoretically instantaneously reversible.

Another object of the present invention is to provide a power transmitting apparatus which combines the power transmission efficiency of gearing with the shock resistant capability of fluid coupling.

Another object of this invention is to present a power transmitting apparatus which provides an all gear transmission with infinitely varying power to load ratio in either direction.

It is a further object of this invention to provide a power transmitting apparatus which is simple of construction and in which there is substantially no slippage.

A power transmitting apparatus constructed in accordance with the teachings of this invention and the method of using the same is described herein with reference to the drawings in which:

FIG. 1 is a partially diagrammatic perspective view of a power transmitting apparatus constructed in accordance with the teachings of this invention;

FIG. 2 is a longitudinal sectional view of the power transmitting apparatus shown in FIG. 1;

Figure 3:
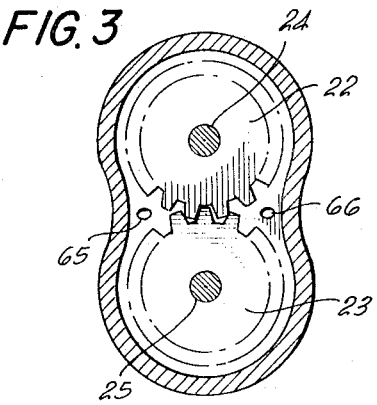
FIG. 3 is a partially sectional view taken along the line 3—3 in the direction of the arrows as seen in FIG. 2.
Figure 5:
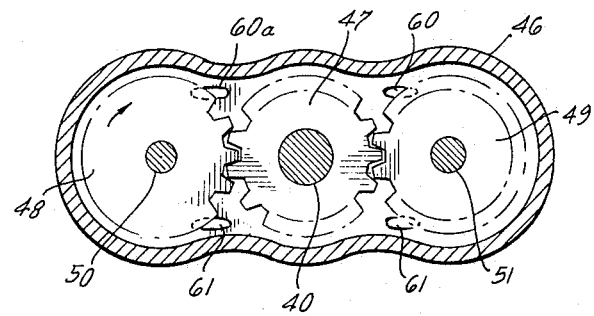
FIG. 5 is a partially sectional view taken along the line 5—5 in the direction of the arrows as seen in FIG. 2.
Figure 4:
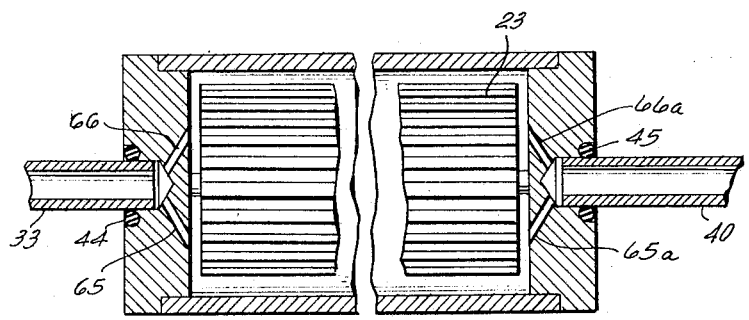
FIG. 4 is a partially sectional view taken along the line 4—4 in the direction of the arrows as seen in FIG. 2.
Figure 6:
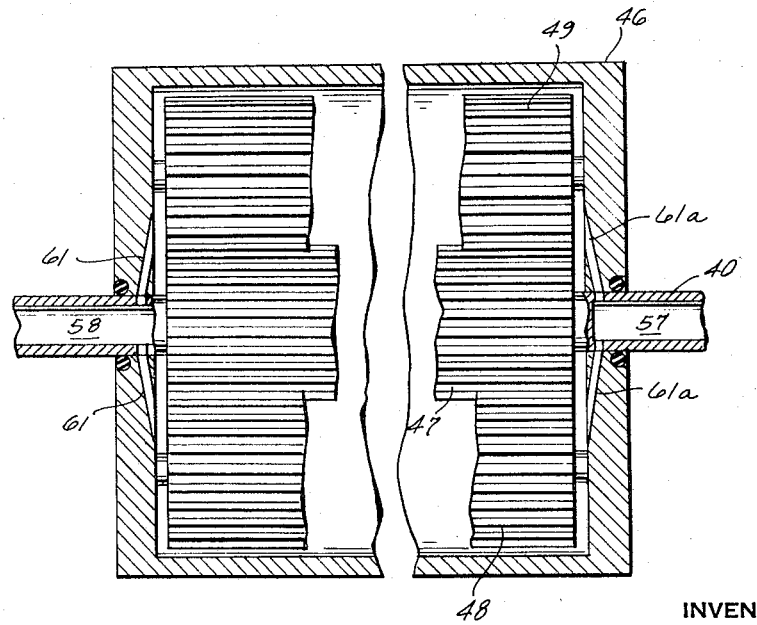
FIG. 6 is a partially sectional view taken along the line 6—6 in the direction of the arrows as seen in FIG. 2.

In the power transmitting apparatus shown in the figures the numerals 10 and 11 designate pumping units and the numeral 12 designates the transmission portion of the apparatus.

The apparatus is supported by posts 13, 14, 15 and 16 with pump 10 between posts 13 and 14, pump 11 between posts 15 and 16, and transmission portion 12 between posts 14 and 15.

The transmission portion 12 includes a gear type pump 18 having a casing 19 with ends 20 and 21, and elongated meshing gears 22 and 23 supported by shafts 24 and 25 respectively. Shaft 24 is rotatably supported in bearings 26 and 27 in the casing ends and shaft 25 is rotatably supported in bearings 28 and 29 in the casing ends. Pinion 30 is fixed to the free end of shaft 24 which projects through casing end 20 and meshes with the teeth of gear 31 in an internal contact. Gear 31 is keyed at 32 to shaft 33 which is supported by post 14 in bearings 34, 35 and 36. At the remaining end of the transmission portion of the apparatus pinion 37 is fixed to the free end of shaft 25 which projects through casing end 21 and meshes with the teeth of gear 38 in an internal contact. Gear 38 is keyed at 39 to shaft 40 which is supported by post 15 in bearings 41, 42 and 43.

End bearing 44 in case end 20 receives the end of shaft 33 and end bearing 45 in case end 21 receives the end of shaft 40 so that casing 19 is free to rotate with respect to supporting shafts 33 and 40.

Shaft 40 runs through housing 46 of pump 11 and elongated spur gear 47 is keyed thereto. Housing 46 also contains elongated spur gears 48 and 49 which are keyed to shafts 50 and 51 which are rotatably supported in housing 46 so that the teeth of gears 48 and 49 mesh with the teeth of gear 47 to provide therewith a hydraulic pump with housing 46 rigidly fastened to post 15 by angle bracket 52. The remaining end of shaft 40 is rotatably supported in post 16 by bearing 53.

Likewise pump 10, which is identical to pump 11, has its housing 54 rigidly fastened to post 14 by angle bracket 55 and is supported by shaft 33 which runs therethrough with its end rotatably supported in post 13 by bearing 56.

Shaft 40 is provided with voids 57, 58 and 59 with void 57 communicating with the interior of housing 46 through passages 60 and 61 and void 58 communicating with the interior of housing 46 through passages 60a and 61a formed in the housing ends. Pump 10 being identical to pump 11, is provided with passages in the ends of its housing to communicate the interior thereof with voids 62 and 63 formed in shaft 33 in which void 64 is also provided. Voids 64 and 59 respectively communicate with the interior of casing 19 through passages 65 and 66 formed in the ends 20 and 21 respectively. Appropriate seals are provided throughout so that hydraulic fluid within the voids or the housings or casings will not leak out.

Post 14 contains hydraulic lines 67 and 68 which respectively communicate with voids 63 and 64 through orifices 69 and 70 formed in the post. Lines 67 and 68 are connected externally of post 14 to control 81 which can direct lines 68 and 68 to sump 80 or connect the lines together in accordance with the desired control setting. Control 75 is provided in line 68 to allow control of the volume of flow through line 68. Post 15 contains hydraulic lines 71 and 72 which are respectively communicating with voids 59 and 58 through orifices 73 and 74 formed in post 15. Line 71 is shown in solid lines connected to common sump 80. Post 13 contains hydraulic line 76 which communicates sump 80 with void 62 through orifice 77 formed in the post. Post 16 contains hydraulic line 78 which connects with void 57 through orifice 79 formed in post 16.

In order to describe the operation of the system gear 38 will be considered as the load to be driven by gear 31. Considering first the situation with control 81 set for lines 67 and 68 to communicate with the sump.

With shaft 33 rotated by power source 82 and the hydraulic fluid permitted to flow freely, rotation of gear 31 will rotate gear 30 and cause casing 19 to rotate about its axis provided by shafts 33 and 40 at its maximum speed with gear 37 riding inside the gear 38. Gear 38 will not be rotated as gear 37 will ride freely in it. Under such circumstances no power is transmitted from shaft 33 to shaft 40 and fluid will flow freely from sump 80 through line 71, void 59, the interior of casing 19, void 64 and line 68 to return to the common sump 80. If, however, the hydraulic fluid is prevented from freely moving through the system by operation of hydraulic control 75 the shaft 40 begins to rotate at stoppage of flow through line 68, shaft 33, case 19 and shaft 40 all rotate at the same speed. Gears 22 and 23 are hydraulically locked and power can now be transmitted from shaft 33 to shaft 40 since gears 30 and 37 will not be free to move and rotation of gear 31 will result in rotation of case 19 and gear 38 at speed of gear 31. It can be seen, therefore, then in this situation maximum power is transmitted via transmission 12. Intermediate operation can be achieved through partial restriction of flow of fluid so that gears 22 and 23 can rotate allowing the casing 19 to be rotated, although the rotation will be limited by the friction of the fluid within the casing and the inability of gears 22 and 23 to rotate freely.

The next situation to be considered in describing the operation of the device is with control 81 set so that hydraulic lines 67 and 68 are interconnected. In this situation rotation of shaft 33 by power source 82 allows the resultant pumping action of pump 10 to pump hydraulic fluid from sump 80 through line 76, cavity 62, housing 54, cavity 63, lines 67 and 68, cavity 64, casing 19, cavity 59 and line 71 to the common sump 80. This will result in motorizing transmission 12 causing gear 38 and shaft 40 to be rotated faster than gear 31 and shaft 33.

In the absence of pumping action of pump 10 and in the condition where both hydraulic lines 67 and 68 are connected to the sump and going from zero load to maximum load on the output shaft—the friction in transmission 12 adds to the efficiency of the unit. In going above a 1 to 1 ratio—in the presence of pumping action of pump 10 the friction decreases the efficiency.

The system is reversible and providing controls 75' and 81' in lines 71 and 72 functionally identical to control 75 and 81 will allow reverse operation of the unit.

Thus it is seen that there has been provided a power transmission apparatus capable of coupling a variable power source to a constant load or vice versa and in which the power flow is theoretically instantaneously reversible. The efficiency of gearing with the shock resistant capability of fluid coupling has been achieved in a simple device exhibiting substantially no slippage.

Thus among others the several objects as specifically aforenoted are achieved. Obviously, numerous changes and modifications can be resorted to without departing from the spirit of the invention as defined by the claims.

I claim:

1. In a power transmission apparatus an input shaft and an output shaft, input and output facing internal gears mounted respectively on said input and output shafts, input and output pinions engaging respectively with said input and output internal gears, first and second parallel shafts of said input and output pinions respectively, first and second meshing elongated gears mounted on said first and second shafts respectively, a casing surrounding said elongated gears, first and second casing ends, said pinion shafts supported by said casing ends with said pinions outwardly thereof, said input and output shafts rotatably supporting said first and second casing ends respectively, first and second hydraulic conduit means through said first and second casing ends respectively, hydraulic fluid supply means to said hydraulic conduit means whereby upon rotation of said input shaft hydraulic fluid from said hydraulic fluid supply means will flow in said hydraulic conduit means and said casing will rotate and said output shaft remain stationary, and blocking means for obstructing said fluid supply means whereby a hydraulic lock will be formed between said elongated gears and said output shaft will be rotated through said facing gears, said pinions and said elongated gears.

2. In a power transmission apparatus, input and output gears, input and output pinions engaging respectively with said input and output gears, first and second shafts of said input and output pinions respectively, first and second meshing gears mounted on said first and second shafts respectively, a casing surrounding said meshing gears, first and second casing ends, said pinion shafts supported by said casing ends with said pinions outwardly thereof, said casing being rotatably supported, first and second hydraulic conduits respectively communicating with the interior of said casing, hydraulic fluid within said hydraulic conduits and said casing whereby upon rotation of said input gear hydraulic fluid will flow through said conduits and said casing and said casing will rotate and said output gear remain stationary, and blocking means for obstructing flow of fluid in said conduits and said casing whereby a hydraulic lock will be formed between said meshing gears and said output gear will be rotated through said pinions and said meshing gears.

3. A power transmission apparatus in accordance with claim 2 in which said first hydraulic conduit communicates with said casing at said first casing end and said second hydraulic conduit communicates with said casing at said second casing end and normal flow of fluid is from said second conduit through said casing to said first conduit.

4. A power transmission apparatus in accordance with claim 3 in which said blocking means is in said first conduit.

5. A power transmission apparatus in accordance with claim 3 in which hydraulic pump means is provided for pumping fluid from said first conduit through said casing to said second conduit and control means are provided for communicating said pump means with said first conduit.

6. A power transmission apparatus in accordance with claim 2 in which said input and output gears are mounted on input and output shafts respectively and said input and output shafts support said casing, said input and output shafts being provided with first and second voids respectively forming portions of said first and second hydraulic conduits.

7. A power transmission apparatus in accordance with claim 5 in which second hydraulic pump means is provided for pumping fluid from said second conduit through said casing to said first conduit to reverse the direction of power flow in the apparatus.

8. In a power transmission apparatus an input shaft, means for driving said input shaft in rotary motion, a first hydraulic pump mounted on said input shaft and driven thereby, an input internal gear mounted on said input shaft, an output shaft, a casing rotatably supported by said input and output shafts, an output internal gear mounted on said output shaft, input and output pinions engaging respectively with said input and output internal gears, first and second pinion shafts respectively projecting within said casing, first and second meshing gears within said casing mounted on said pinion shafts respectively, a sump, a first hydraulic conduit from said sump to said first hydraulic pump, a second hydraulic conduit from said pump, a third hydraulic conduit out of said casing to said sump, a fourth hydraulic conduit into said casing, a first control means for interconnecting said second and fourth conduits and for directing said second and fourth conduits to said sump and second control means for inhibiting flow of fluid in said fourth hydraulic conduit.

References Cited by the Examiner

UNITED STATES PATENTS

| 1,834,653 | 12/1931 | Schreiner | 74—774 |
|---|---|---|---|
| 1,883,685 | 10/1932 | Gasterstadt | 74—794 |
| 2,219,984 | 10/1940 | Fersing | 74—687 |
| 2,285,466 | 6/1942 | Schwarzbach | 74—774 |
| 2,536,200 | 1/1951 | McDonald | 192—61 |

FOREIGN PATENTS

| 593,536 | 3/1934 | Germany. |
|---|---|---|
| 450,488 | 7/1936 | Great Britain. |

DAVID J. WILLIAMOWSKY, *Primary Examiner.*

T. C. PERRY, *Assistant Examiner.*